Figure 1:
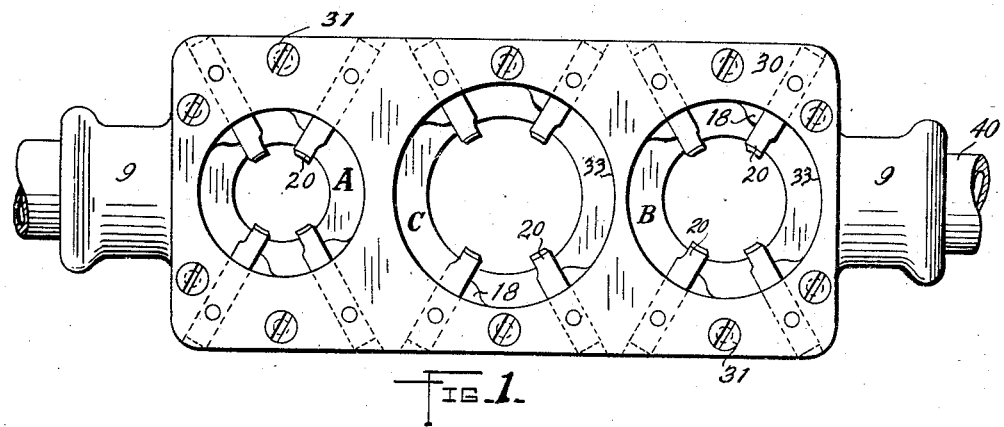

I. W. NONNEMAN.
DIESTOCK.
APPLICATION FILED APR. 30, 1918.

1,340,972.

Patented May 25, 1920.
2 SHEETS—SHEET 1.

Inventor:
Ira W. Nonneman,
By Baker & Macklin, Atty's.

I. W. NONNEMAN.
DIESTOCK.
APPLICATION FILED APR. 30, 1918.

1,340,972.

Patented May 25, 1920.
2 SHEETS—SHEET 2.

Inventor:
Ira W. Nonneman,
By Bates & Macklin,
Attys.

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

DIESTOCK.

1,340,972.        Specification of Letters Patent.        Patented May 25, 1920.

Application filed April 30, 1918. Serial No. 231,781.

*To all whom it may concern:*

Be it known that I, IRA W. NONNEMAN, a citizen of the United States, residing at Warren, in the county of Trumbull and State of Ohio, have invented a certain new and useful Improvement in Diestocks, of which the following is a full, clear, and exact description, reference being had to the accompanying drawings.

This invention relates to die stocks of the type wherein chasers are held in fixed cutting positions and an integral portion of the frame is formed into a sleeve to guide the pipe being threaded. Such die stocks have the advantage of cheapness and simplicity; they have the disadvantage that the fixed guide prevents threading close to a coupling or other fitting on the pipe which cannot pass through the guiding sleeve, and prevents threading of a very short piece of pipe held in a vice.

An object of my invention is to provide a cheap and simple die stock having the rigid guiding sleeve formed by the frame but having means whereby the chasers may be readily taken out and inverted to enable threading from the opposite side, where there is no guiding sleeve. This makes it possible to thread a short piece or to thread clear up to a coupling or other fitting on the pipe.

Normally the chasers are so held in my die stock that they are adapted to cut the desired thread on a pipe entering through the sleeve, but whenever desired the chasers may be taken out and inverted, and the threading effected from the opposite side of the die stock. In this latter operation, the pipe guide is ordinarily inactive and care must be taken to keep the axis, about which the chasers lie, coincident with the axis of the pipe, but die stocks without guides are thoroughly practicable and the one furnished by this invention very effectively provides for the emergency of having to thread a very short piece or close to a fitting. By reason of this interchangeable capacity, my die stock obviates the necessity for an additional die stock, which would otherwise be required for this special work.

My die stock is very readily adaptable for embodiment in a multiple tool and is so illustrated in the drawings hereof. The characteristics of the invention are hereinafter more fully explained in connection with the drawings and the essential features are summarized in the claims.

Figure 2:
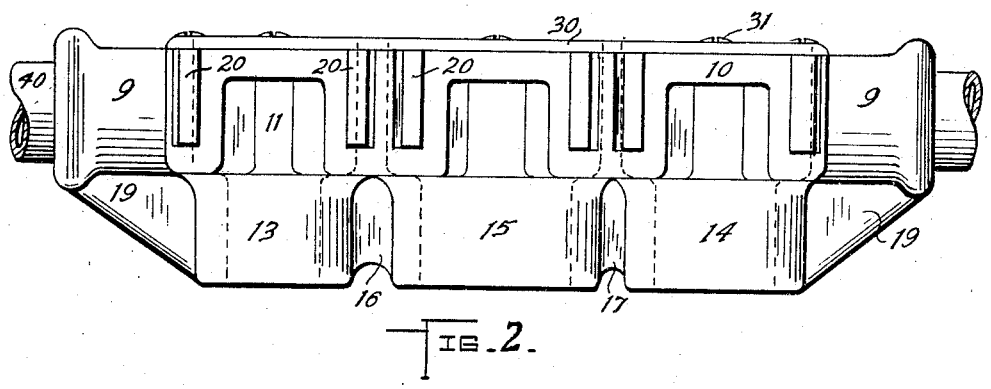
Figure 3:
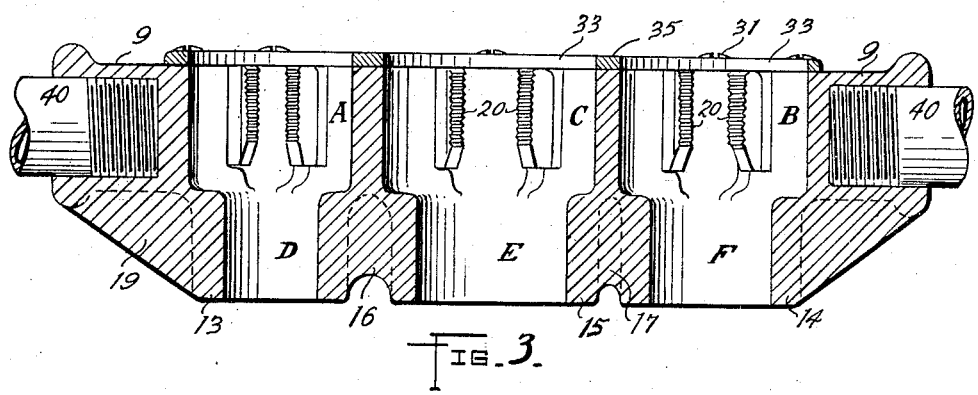
Figure 4:
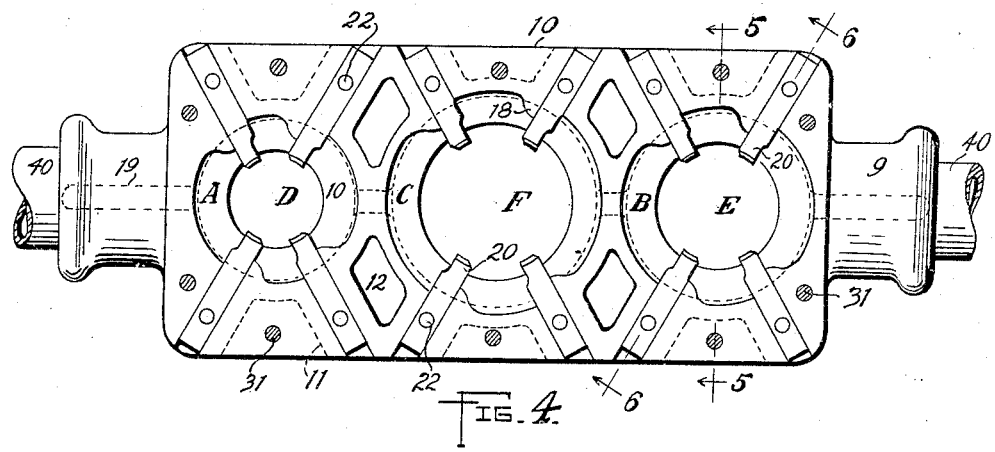
Figure 5:
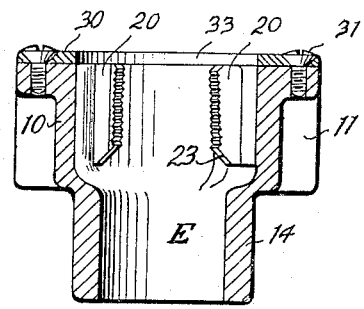
Figure 6:
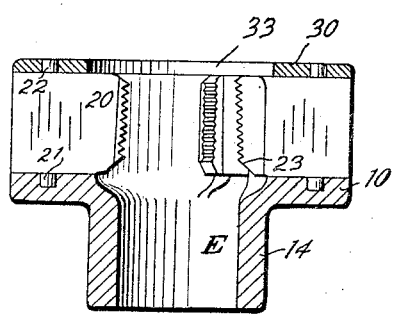
Figure 7:
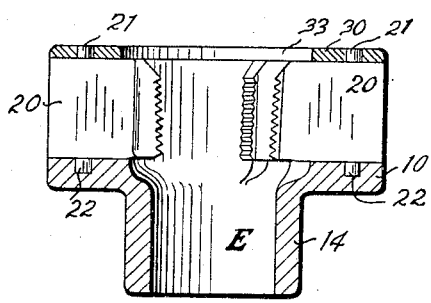

In the drawings, Figure 1 is a plan of my die stock, embodied in a device for cutting threads on pipes of three sizes, for example, half-inch, three-quarter inch and inch pipes; Fig. 2 is a side elevation of such die stock; Fig. 3 is a longitudinal section of the die stock through the axes of the pipe passageways; Fig. 4 is a plan of the die stock with the top plate removed; Fig. 5 is a cross section at right angles to Fig. 3, as indicated by the line 5—5 on Fig. 4; Fig. 6 is an oblique cross section of the die stock, as indicated by the line 6—6 on Fig. 4; Fig. 7 is a cross section of the die stock on the same plane as Fig. 6, but with the chasers inverted to cut a tapered thread from the opposite direction.

The frame of the die stock shown consists of a single integral piece having a block-like head 10 in which are three cylindrical chambers, A, B and C, and beyond these chambers are three sleeve-like portions D, E and F, the bores of which are of smaller diameter than the corresponding chamber and are only slightly larger than the exterior of the standard size of pipe which that section of the die stock is adapted to thread. The walls of the chambers, A, B and C, are simply part of the rectangular block 10, which is cored out for lightness, as illustrated at 11 and 12 in Fig. 4. The walls forming the sleeve portions, designated 13, 14 and 15 are substantially cylindrical, being connected by webs 16 and 17. The handle sockets 9 are integral portions of the frame at the opposite ends of the so-called rectangular block. Suitable webs 19 may connect these handle portions with the extreme sleeves 13 and 14. This frame is light and at the same time strong.

The chasers 20, preferably in sets of four each, are mounted in radial recesses in the block or head portion 10 of the die stock. These chasers are held in place by means of lugs 21 and 22 thereon which occupy recesses in the frame 10 at the base of the chaser guideways, and at the other edge occupy openings through a top plate 30 secured to the plate 10 by screws 31. The frame 10 together with the plate 30 completely embrace the chasers, and the lugs 21 and 22 seating in the respective recesses tightly lock the chasers against movement in the guideways.

The normal position of the chasers is as shown in Figs. 5 and 6, where the beveled corner 23 is adjacent to the guiding sleeve and (if the chaser is to cut a tapered thread) the threads incline toward the axis as they approach the plate 30. Now, to thread close to a coupling or other obstruction on the pipe, I simply take out the screws 31, remove the plate 30, lift out the chasers 20 and invert them and replace the cover 30 and screw in the screws 31. The chasers are then in the relative position indicated in Fig. 7. When in this position, the side adjacent to the plate 30 is fed to the pipe to be threaded. The circular opening 33 in the plate 30 is large enough for the passage of an ordinary fitting, such as a coupling or elbow end, so that the threading may be continued until the edge of the chasers actually abut the fitting.

It is convenient to make the bore of the chambers A, B, and C of substantially the same large size as the holes 33 through the cover-plate to allow for the ready discharge of chips and ease of oiling. To relieve the chasers from excessive cross strain, I provide reinforcing ribs 18 formed as an integral part of the frame and engaging these chasers on the side to receive the lateral thrust.

When the die stock is arranged with three sets of chasers for three different sizes of pipe, as shown herein, I find it most convenient to place the largest size at the center as indicated by the guideway F and chaser cavity C and the smaller sizes near the ends. The actual number of sizes, however, may be varied from that shown, as may be found most convenient. The usual removable handles 40 (broken away in the drawings) screw into the sockets 9 for operating the die stock.

Having thus described my invention, what I claim is:

1. In a die stock, the combination, with a frame having chaser guideways adjacent to one face and a sleeve portion adjacent to the opposite face, a removable cover plate for said guideways, removable chasers occupying the guideways and having shoulders on their top and bottom edges, and means adapted to engage said shoulders for locking the chasers in place either edge up.

2. In a die stock, the combination, with a frame having a chaser guideway, a removable cover for the guideway, a removable chaser occupying the guideway and having correspondingly positioned pins projecting from its upper and lower edges, there being recesses in the frame and cover each adapted to receive either pin for locking the chaser in place either edge up.

3. In a die stock, the combination of a frame having guideways for chasers, a cover-plate extending across the guideways, chasers occupying the guideways, and coöperating lugs and recesses causing fixed engagement between the bottom edges of the chasers and the frame and between the top edges of the chasers and the cover plate but allowing the chasers to be inverted when the cover plate is removed.

4. In a die stock, the combination with a frame having chaser guideways, of a cover plate extending across the guideways, recesses in the cover plate and in the base of the guideways, chasers adapted to occupy the guideways and having projecting lugs at opposite edges adapted to engage said recesses, either lug being adapted to enter either recess.

5. In a die stock, the combination of a head having a chamber, a cover plate secured to the head and having an opening opposite the end of the chamber, radial recesses in the wall of the head beneath the cover plate and extending thereto, chasers occupying said recesses, said chasers being provided at their opposite edges with alined projecting pins which are adapted to interchangeably occupy recesses in the head and in the cover plate, and an integral guiding sleeve projecting from the head and having a bore of less diameter than the opening through the cover plate.

In testimony whereof, I hereunto affix my signature.

IRA W. NONNEMAN.